(12) United States Patent
Berger

(10) Patent No.: US 7,936,922 B2
(45) Date of Patent: May 3, 2011

(54) METHOD AND APPARATUS FOR SEGMENTING IMAGES

(75) Inventor: Ralf Berger, Acton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1195 days.

(21) Appl. No.: 11/562,789

(22) Filed: Nov. 22, 2006

(65) Prior Publication Data

US 2008/0118118 A1    May 22, 2008

(51) Int. Cl.
*G06K 9/34* (2006.01)
*G06K 9/00* (2006.01)
*H04N 1/46* (2006.01)

(52) U.S. Cl. ........ 382/173; 382/128; 382/164; 382/171; 358/538

(58) Field of Classification Search .................. 382/128, 382/173; 358/538
See application file for complete search history.

(56) References Cited

U.S. PATENT DOCUMENTS

| | | | | |
|---|---|---|---|---|
| 4,961,425 | A * | 10/1990 | Kennedy et al. | 600/425 |
| 6,249,594 | B1 * | 6/2001 | Hibbard | 382/128 |
| 6,980,682 | B1 | 12/2005 | Avinash et al. | |
| 7,136,516 | B2 | 11/2006 | Alyassin | |
| 7,289,653 | B2 * | 10/2007 | Zhang et al. | 382/131 |
| 7,339,585 | B2 * | 3/2008 | Verstraelen et al. | 345/424 |
| 7,379,572 | B2 * | 5/2008 | Yoshida et al. | 382/128 |
| 7,397,937 | B2 * | 7/2008 | Schneider et al. | 382/130 |
| 2003/0113003 | A1 | 6/2003 | Cline et al. | |
| 2007/0217668 | A1 * | 9/2007 | Bornemann et al. | 382/132 |
| 2009/0175527 | A1 * | 7/2009 | Agliozzo et al. | 382/132 |
| 2010/0027861 | A1 * | 2/2010 | Shekhar et al. | 382/131 |

FOREIGN PATENT DOCUMENTS

WO    WO 9839736 A1 *  9/1998

OTHER PUBLICATIONS

Kenneth R. Castleman, "Digital Image Processing," 1996 Prentice Hall, Chapter 18, pp. 447-481.

* cited by examiner

*Primary Examiner* — Brian Q Le
*Assistant Examiner* — Jose M Torres
(74) *Attorney, Agent, or Firm* — Robert C. Kowert; Meyertons, Hood, Kivlin, Kowert & Goetzel, P.C.

(57) ABSTRACT

Method and apparatus for extending regions in two-dimensional (2-D) image space or volumes in three-dimensional (3-D) image space that are generated by a test area-based region growing mechanism. Embodiments of a dilation mechanism may perform post-processing of a region or volume generated by the test area-based region growing mechanism to correct for an edge inset resulting from a radius used to define the test area. The dilation mechanism may perform a morphological dilate to expand the region or volume to the proper edge of the desired object in the image data within the tolerance range of the threshold, and thus corrects for the inset error introduced by the test area radius used by the region growing mechanism. The dilation mechanism may be limited to extending the region or volume to the radius distance from the edge of the original region or volume generated by the region growing mechanism.

30 Claims, 10 Drawing Sheets

METHOD AND APPARATUS FOR SEGMENTING IMAGES

BACKGROUND

1. Field of the Invention

This invention relates to digital image processing, and more specifically to digital image segmentation methods.

2. Description of the Related Art

The capturing and processing of digital images has applications in many fields, including but not limited to applications in the medical, astronomy, and security fields. Digital images may be captured using a variety of mechanisms. Conventionally, images may be captured in the electromagnetic spectrum, including visible light images, infrared images, X-Ray images, radiotelescope images, radar images such as Doppler Radar images, and so on. Common digital image capturing mechanisms for images in the electromagnetic spectrum include, but are not limited to, digitizing cameras that include EM spectrum-sensitive sensors that directly digitize images in the electromagnetic spectrum and film scanners that digitize conventionally photographed or otherwise captured images from film or from photographs. Note that digital images may be captured as grayscale ("black and white") images or color images, and that color images may be converted to grayscale images and vice versa. Also note that digital images may be captured for viewing objects and events from the subatomic level in particle accelerators, through the microscopic level, and on up to the level of clusters of deep-space galaxies as captured by the Hubble Space Telescope.

Digital images may be generated by other methods than directly capturing images in the electromagnetic spectrum. For example, in the medical field, non-invasive mechanisms have been developed for viewing the internal organs and other internal structures other than the conventional X-Ray. Examples include Magnetic Resonance Imaging (MRI), computed tomography (CT), positron emission tomography (PET), and ultrasound systems. In these systems, data is captured using some indirect mechanism and converted into "conventional" viewable grayscale or color images. Note that at least some of these mechanisms have found applications in other fields than the medical field, for example, in various engineering fields, for example in examining the structural integrity of metals such as structural steel or airplane parts and, in paleontology, in non-invasively viewing the internal structure of a fossil.

Some image capturing mechanisms, such as MRI, CT, and PET systems, may be able to capture digital image "slices" of an object such as a human body. For example, an MRI system may be used to generate a set of images representing "slices" taken through an portion of the human body containing a particular internal organ or organs or other structure—even the entire body may be so imaged. This set of images may be viewed as a three-dimensional (3-D) rendering of the object. Each individual image may be viewed as a "conventional" two-dimensional (2-D) image, but the set of captured images contains data that represents three-dimensional information, and that may be rendered using various rendering techniques into 3-D representations of a particular object or structure.

FIG. 1 illustrates a two-dimensional (2-D) digital image. A pixel ("picture element") is the basic element or unit of graphic information in a 2-D digital image. A pixel defines a point in two-dimensional space with an x and y coordinate. FIG. 2 illustrates pixels in 2-D image space. Each cube in FIG. 2 represents one element of graphic information, or pixel. Each pixel may be specified by a coordinate on the x and y axes as (x,y). In 2-D image space, a pixel (not on the edge of the image) may be considered as having eight adjacent pixels, if diagonally-adjacent pixels are considered as connected. For example, pixel (1,1) in FIG. 2 has eight-connected pixels. If diagonally-adjacent pixels are not considered as connected, a non-edge pixel would have only four connected pixels.

In 2-D image space, a region is a connected set of pixels; that is, a set of pixels in which all the pixels are adjacent and connected, and in which the pixels are typically associated according to some other criterion or criteria. In 2-D image space, four-connectivity is when only laterally-adjacent pixels are considered connected; eight-connectivity is when laterally-adjacent and diagonally-adjacent pixels are considered connected.

FIG. 3 illustrates a three-dimensional (3-D) digital image set. A 3-D digital image is essentially a stack or set of 2-D images, with each image representing a "slice" of an object being digitized. A voxel ("volume element") is an element or unit of graphic information that defines a point in the three-dimensional space of a 3-D digital image. A pixel defines a point in two-dimensional space with an x and y coordinate; a third coordinate (z) is used to define voxels in 3-D space. A voxel may be specified by its coordinates on the three axes, for example as (x,y,z) or as (z,x,y). FIG. 4A illustrates voxels in 3-D image space. Each cube in FIG. 4A represents one element of graphic information, or voxel. Each voxel may be specified by a coordinate on the x, y and z axes as (x,y,z) or (z,x,y). In 3-D image space, a voxel (not on the edge of the image) may be considered as having 26 adjacent voxels, if diagonally-adjacent voxels are considered as connected. For example, voxel (1,1,1) in FIG. 4A has 26 connected voxels. FIG. 4B shows adjacent voxels to voxel (1,1,1) if diagonally-adjacent voxels are not considered as connected. In FIG. 4B, voxel (1,1,1) has six connected voxels.

In 3-D image space, a volume is a connected set of voxels; that is, a set of voxels in which all the voxels are adjacent and connected, and in which the voxels are typically associated according to some other criterion or criteria. In 3-D image space, six-connectivity is when only laterally-located voxels are considered connected; 26-connectivity is when laterally-adjacent and diagonally-adjacent voxels are considered connected.

For simplicity, the term "element" may be used herein to refer to both pixels and voxels. In a digital image, each element (pixel or voxel) may be defined in terms of at least its position and graphic information (e.g., color, and density). The position specifies the location of the element in the 2-D or 3-D image space as coordinates. Color and density are components of the graphic information at the corresponding position. In a color image, the specific color that an element (pixel or voxel) describes is a blend of three components of the color spectrum (e.g., RGB). Note that some graphic information (e.g., color) may not be actually "captured" but instead may be added to an image. For example, an image captured in grayscale may have "pseudocolors" added for various reasons. An example is the various shades of blue, yellow, green and red added to Doppler Radar-captured images to represent various amounts of rainfall over a geographic region.

Image Segmentation

Image segmentation refers to a specific area within digital image processing. Image segmentation is one area within the broader scope of analyzing the content of digital images. Image segmentation may also be viewed as the process of locating and isolating objects within a digital image. Various image segmentation techniques have been developed that may be used in various image processing task such as in locating one or more objects of interest, in separating or segmenting two or more adjacent objects, in finding boundaries of objects, in extracting objects of interest from images, in finding objects or structures within objects, and so on.

Image segmentation techniques generally fall into three different categories that represent three different approaches to the image segmentation problem. In boundary locating techniques, boundaries between regions or volumes are located. In edge detection techniques, edge pixels or voxels of objects or structures within an image are identified and then linked to form boundaries. In region growing techniques, each element or a portion of the elements within an image may be assigned to a particular object, region (for 2-D images), or volume (for 3-D images). Note that, in 3-D image space, "volume growing" is analogous to region growing, although as each image in a set of image constituting a 3-D data set is essentially a 2-D image, region growing techniques may be applied to the individual images or 'slices' in the 3-D data set. Further note that region growing techniques developed for 2-D image space can generally be adapted to work in 3-D image space to grow volumes. To avoid confusion herein, the techniques will simply be referred to as "region growing" techniques, although it is important to note that the techniques may be adapted to grow regions in 2-D space or volumes in 3-D space.

As an example of an application of image segmentation techniques, 2-D and 3-D medical images may be segmented for a variety of reasons. For example, in order to measure the volume of a growth or tumor, or to display the coronal tree as a 3D model, sections of 3-D image data captured by MRI, CT Scan, or some other mechanism have to be selected and separated from the entire dataset.

Image segmentation of medical images may be been done manually, and conventionally manual methods have been commonly used. The manual method requires the user to "lasso" the desired pixels in a 2-D image, or voxels in each image in a 3-D data set of two or more captured images or "slices". Manual image segmentation can be a difficult and time-consuming task, especially in the multi-slice case.

Several automated region growing image segmentation techniques that attempt to grow a region (or volume) from a seed location (indicating a particular pixel or voxel within a desired object) have been developed. Typically, region growing technique start at a seed location and grow the region or volume from there. The seed location may define a graphic value or values that may be used in determining whether connected pixels or voxels will be included in the region or volume being grown. Typically, a tolerance range or threshold (s) is provided to be used in testing graphic components of elements (pixels or voxels) connected to the region or volume being grown to determine if the elements are to be added to the region or volume. Typically, a user selects a seed location as the starting location within an object from which a region (or volume) will be automatically grown according to the particular region growing technique being used, and specifies the tolerance or threshold(s). The seed location specifies a "first element" of the region or volume. One or more graphic components of connected elements to the first element (pixels or voxels) are tested and, if the tested graphic components satisfy the specified threshold(s), the connected elements are added to the region or volume. Connected elements to the region or volume are tested and excluded from or added to the growing region or volume, and so on, until all connected elements have been tested and no more connected elements that satisfy the threshold test can be found. Thus, the region or volume grows until all connected elements (pixels or voxels) that pass the threshold test are found.

Medical images, and some images in other fields, often contain narrow connecting pathways between objects in an image, which may introduce difficulties in segmenting the images. This is particularly problematic in medical imaging as structures like the vascular system are particularly hard to segment as they often contain small connections or pathways to other organs, etc. Region growing techniques that simply look at and test the graphic components of single connected pixels or voxels tend to go down these pathways, and thus may grow regions or volumes well beyond the boundaries of the desired objects.

Some region growing mechanisms that have been developed introduce the concept of a radius around the test location (the current element under test) that is applied in an attempt to prevent growing the region or volume down an undesired narrow connection or path. Instead of testing the graphic components of a single element under test to determine if the element meets the threshold requirements, all of the elements within an area defined by the specified radius are tested. If some specified number, e.g. a majority, 75%, or even all, of the elements within the radius-defined area meet the threshold requirements, then the element is added to the region or volume being grown; otherwise, the element is excluded from the region or volume. By requiring that the test area be larger than a single pixel or voxel, single pixel or voxel connections may be avoided. Increasing the test radius results in a corresponding increased requirement for the size of a connecting pathway, reducing the likelihood that a region or volume will be grown down an undesired path or connection.

A problem with a radius based test area for a region growing mechanism is that, if it is required that only a majority of elements in the test area are within the tolerance range, then undesired elements may be included in the region or volume being grown, and narrow connections may even be crossed. If all elements within the test area must be within the tolerance range, then those issues may be avoided, but the region or volume may only grow to within the radius distance of the edge of the desired object in at least some places. This may result in an inset from the desired true edge of the object being selected; elements within this edge inset will not be included in the region or volume, even if the elements meet the test criteria.

SUMMARY

Various embodiments of a method and apparatus for extending regions in two-dimensional (2-D) image space or volumes in three-dimensional (3-D) image space that are generated by a region growing mechanism that uses a test area defined by a radius and that thus includes multiple elements that are tested. Instead of testing the graphic components of a single element under test to determine if the element meets the threshold requirements, the region growing mechanism tests all of the elements within an area defined by the specified radius. If all elements within the test area must be within the tolerance range of the test, then the region or volume may only grow to within the radius distance of the true edge of the desired object, thus leaving an edge inset.

Embodiments of a dilation mechanism may perform post-processing of a region or volume generated by a test area-based region growing mechanism to correct for such an edge inset. The dilation mechanism performs a morphological dilate as described herein to expand the region or volume to the proper edge of the desired object in the image data within the tolerance range of the threshold, and thus corrects for the inset error introduced by the test area radius used by the region growing mechanism. The dilation mechanism may be limited to extending the region or volume to the radius distance from the edge of the original region or volume generated by the region growing mechanism.

Embodiments of the dilation mechanism implement a dilation method that iterates over elements in at least a portion of the image data set (the set of all elements in the 2-D or 3-D image) and adds elements to the edge of the region, or rejects elements, in accordance with a set of one or more rules or tests for inclusion in the region. The one or more rules or tests for inclusion may include, but are not limited to, a distance test, a connectivity test, and a threshold test.

Embodiments of the dilation mechanism may iterate over or otherwise examine at least a portion of the elements in the image data set to locate elements that are connected to elements that are already included in the region according to a connectivity rule being used. If an element is found that is not included in the region and that is connected to an element that is included in the region, and if the location of the element, as determined by its coordinates in the image space, is within the distance of the radius from the edge of the original region generated by the region growing mechanism, and if the graphic component(s) of the element pass the threshold test, the element is added to the region. Otherwise, the element is not added to the region. In addition, the element may be, but is not necessarily, excluded from further testing to prevent the dilation mechanism from testing the element again. Thus, iterations of the dilation mechanism may tend to add one layer of elements to the edge of region, expanding the edge of the region from the original region out to the limit of the radius used by the region growing mechanism to grow the original region.

Embodiments of the dilation mechanism may be implemented in image processing systems that include region growing mechanisms for segmenting desired objects in two-dimensional (2-D) and 3-dimensional (3-D) images. Note, however, that embodiments of the dilation mechanism as described herein may be implemented to work with other types of image segmentation mechanisms that may leave edge insets or other gaps in located regions or volumes.

BRIEF DESCRIPTION OF THE DRAWINGS

FIGS. 8A through 8H graphically represent an image segmentation process that implements a region growing mechanism that uses a test area defined by a radius to grow a region and a dilation mechanism to extend the region to correct for the edge inset left by the region growing mechanism, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for extending regions in two-dimensional (2-D) image space or volumes in three-dimensional (3-D) image space that are generated by a region growing image segmentation mechanism that uses a test area defined by a radius and that thus includes multiple elements that are tested. Note that, in 2-D image space, an element is one pixel; in 3-D image space, an element is one voxel. Instead of testing the graphic components of a single element under test to determine if the element meets the threshold requirements, the region growing mechanism tests all of the elements within an area defined by the specified radius. If all elements within the test area must be within the tolerance range of the test, then the region or volume may only grow to within the radius distance of the true edge of the desired object, thus leaving an edge inset.

Embodiments of a dilation mechanism as described herein may be used to perform post-processing of a region or volume to correct for such an edge inset. The dilation mechanism performs a morphological dilate as described herein to expand the region or volume to the proper edge of the desired object in the image data within the tolerance range of the threshold, and thus corrects for the inset error introduced by the test area radius used by the region growing mechanism. The dilation mechanism may be limited to extending the region or volume to the radius distance from the edge of the original region or volume generated by the region growing mechanism.

Embodiments of the dilation mechanism may be implemented in image processing systems that include region growing mechanisms for segmenting desired objects in two-dimensional (2-D) and 3-dimensional (3-D) images. Note, however, that embodiments of the dilation mechanism as described herein may be implemented to work with other types of image segmentation mechanisms that may leave edge insets or other gaps in located regions or volumes.

Figure 1:
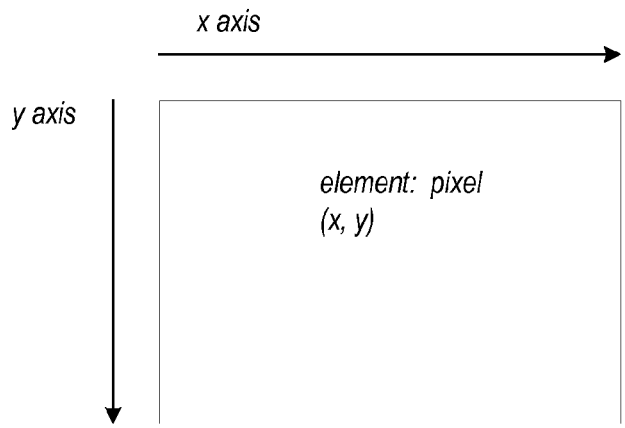
FIG. 1 illustrates a two-dimensional (2-D) digital image.
Figure 2:
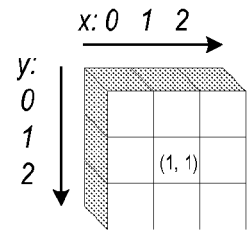
FIG. 2 illustrates pixels in 2-D image space.
Figure 3:
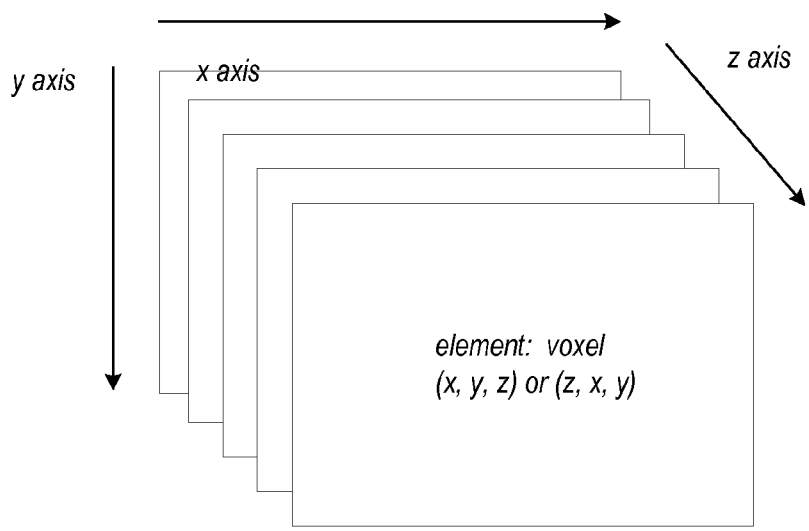
FIG. 3 illustrates a three-dimensional (3-D) digital image set.
Figure 4A:
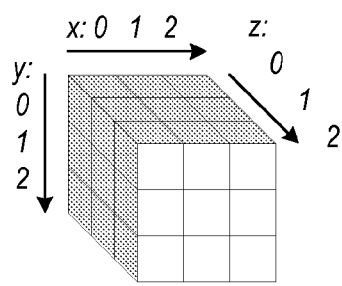
FIGS. 4A and 4B illustrate voxels in 3-D image space.
Figure 4B:
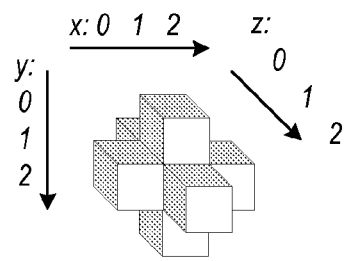
Figure 5:
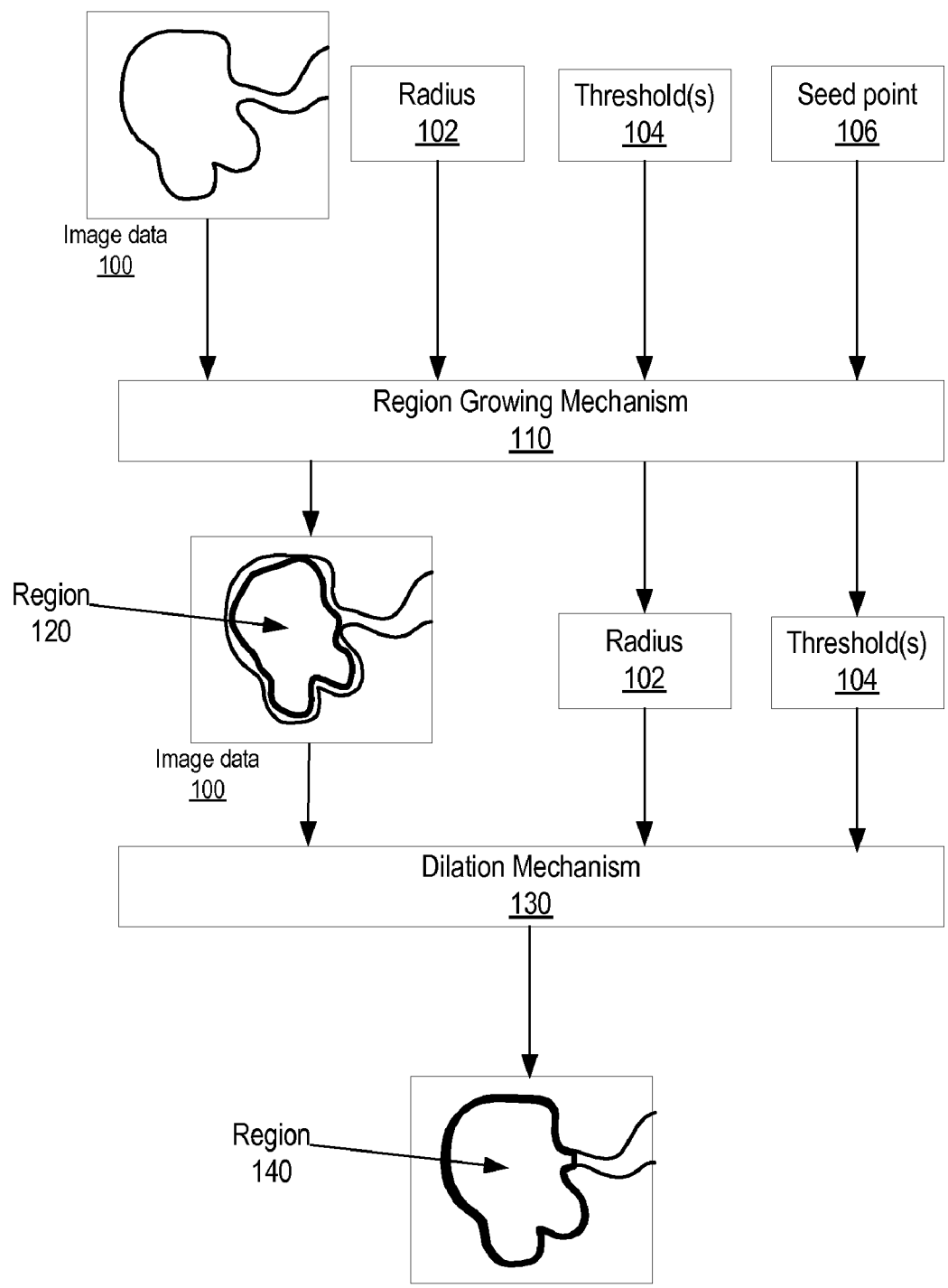
FIG. 5 illustrates data flow in an image segmentation process that implements a test area-based region growing mechanism and a dilation mechanism to perform post-processing of a region or volume generated by the region growing mechanism, according to one embodiment.

FIG. 5 illustrates data flow in an image segmentation process that implements a dilation mechanism to perform post-processing of a region or volume generated by a region growing mechanism to correct for an edge inset introduced by a radius used in determining a test area around an element under test by the region growing mechanism, according to one embodiment.

Inputs to the region growing mechanism 110 may include, but are not limited to, digital image data 100, a radius 102, threshold(s) 104, and a seed point 106. Image data 100 is the digital image data set that is to be segmented using embodiments of an image segmentation process as described herein may be any type of digital images, and may be captured via any type of digital image capturing technology, as previously described. In particular, image data 100 may be medical images. Image data 100 may include a 2-D image or a 3-D image set. In particular, image data 100 may be medical 3-D image sets including a number of "slices" such as images generated by an MRI, CT Scan, or other 3-D medical imaging technology.

Radius 102 defines a radius value for the test area around an element (pixel or voxel) under test. Radius 102 represents a distance from the element under test that is used to scribe a test area around the element under test. In one embodiment, a portion or all of the elements that are within the radius distance from the element under test by the region growing mechanism 100 may be considered when testing the particular element under test to determine if the element under test is to be added to (or excluded from) the region or volume being grown. Note that, in a 2-D image, the test area itself may be described as a region; in a 3-D image set, the test area may be described as a volume.

In one embodiment, radius 102 may be specified by a human operator. Alternatively, radius 102 may be a fixed value, or may be automatically determined. A particular value for radius 102 may be specified or determined to match determining characteristics of image data 100 (e.g., the width of any connecting pathways between objects in image data 100) and/or a particular value for radius 102 may be selected to work well with a general type of image data 100 (e.g., a radius may be selected that works well with medical images captured using a particular medical imaging technology or captured at a particular resolution).

If, for example, the value for radius 100 is specified by a human operator, the value may be specified in standard units of measurement (in medical imaging, typically, metric units such as centimeters or millimeters). The specified value may then be converted from the units of measurement into the number of elements that are contained within that distance at the resolution of the image data 100. For example, in a 2-D image captured at resolution R, the 2-D image may include five pixels for each millimeter on the x and y axes. If the specified value for radius 100 is one millimeter, then the value of radius 100 would be 5. Note, however, that the x and y axes are typically but not necessarily captured in the same resolution, and thus the radius value may need to be adjusted for the differing resolutions. For example, in a 2-D image, a millimeter may include five pixels on the x axis and four pixels on the y axis. The radius 100 for a 3-D image is similar, although it is more typical in 3-D images containing multiple slices such as those captured using MRI that the resolution on the z axis is different than the resolution on the x and y axes. In general, the voxels on the x and y axes in a 3-D image set are captured closer together than the voxels across the slices on the z axis. Thus, the radius 100 for a 3-D image set may need to be adjusted to account for the different resolution on the z axis to avoid the test area (volume) used by the region growing mechanism 110 from being distorted into an oblong shape, which would negatively impact the tests performed for a current voxel under test. For example, in a 3-D image set, a millimeter may include five pixels on the x axis, five pixels on the y axis, and two pixels on the z axis.

Figures 6A, 6B:
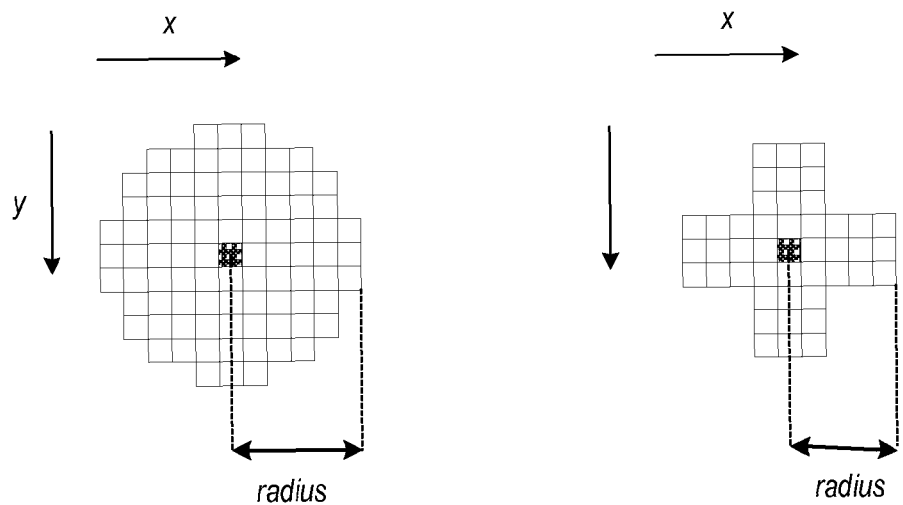
FIGS. 6A and 6B are graphical representations of exemplary test areas that may be used by a region growing mechanism 110 in 2-D image space.

FIGS. 6A, 6B, 7A, and 7B are graphical representations of exemplary test areas that may be used by a region growing mechanism 110. FIG. 6A represents an exemplary test area for a 2-D image. Each square in FIG. 6A represents one pixel. The shaded square represents the pixel under test. In this example, there are five pixels within radius 102 (and thus, the diameter of the test area, in pixels, is eleven). The exemplary test area in this example is roughly circular. However, the shape of the test area in FIG. 6A is exemplary, and that other shapes may be used. For example, FIG. 6B illustrates an exemplary cross-shaped test area with four pixels within radius 102.

Figures 7A, 7B:
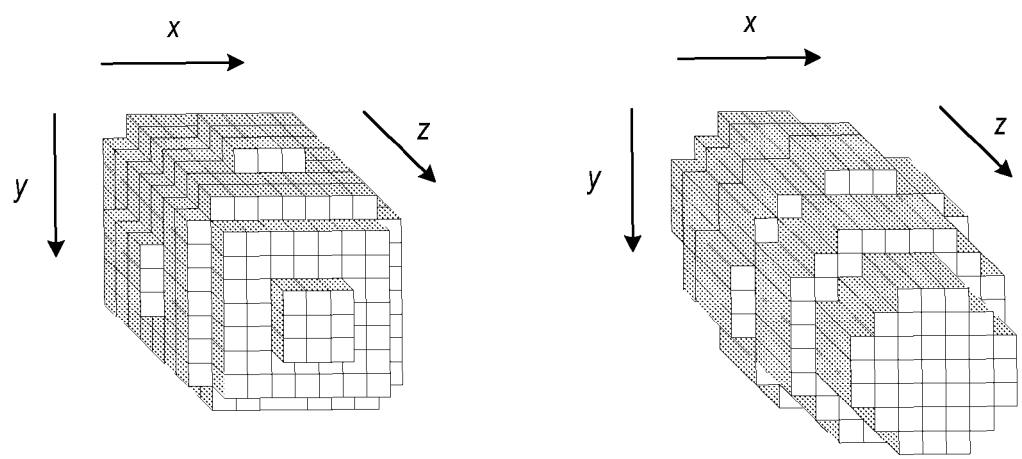
FIGS. 7A and 7B are graphical representations of exemplary test areas that may be used by a region growing mechanism 110 in 3-D image space.

FIG. 7A represents an exemplary test area for a 3-D image space. Each cube in FIG. 7A represents one voxel. The voxel under test is not visible, but is located at the center of the 3-D test area. The exemplary test area in this example is roughly spherical. However, note that the shape of the test area in FIG. 7A is exemplary, and that other 3-D shapes may be used. Further note that the z axis represents the "slices" or images in the 3-D image set. In the exemplary test area of FIG. 7A, there are five voxels within radius 102 on all three axes.

In 3-D image sets, the resolution on the z axis is typically not as "fine" as it is on the x and y axes of each individual image in the image set. Therefore, it may be the case that there is a greater distance between voxels on the z axis than on the x and y axes. To accommodate for the resolution difference, the number of voxels within the radius 102 on the z axis may need to be adjusted. FIG. 7B represents an exemplary test area for a 3-D image space in which the resolution on the z axis (between slices) is coarser than the resolution between voxels on the x and y axes within each slice, and in which the number of voxels within the radius 102 on the z axis have been adjusted. In the exemplary test area of FIG. 7B, there are five voxels within radius 102 on the x and y axes on each slice, but only two voxels within the radius 102 on the z axis.

Referring again to FIG. 5, threshold(s) 104 represents one or more threshold values that may be used by the region growing mechanism 110 in performing tests on the graphic components of elements within image data 100. As an example, in a color image stored in RGB (Red, Green, Blue) format, each element (e.g., pixel) in the image has a color associated with the element and represented by three color components (e.g., Red, Green, Blue (RGB)). Each color component may be stored in the pixel data as a value. For example, in 32-bit color images, each color component may be stored as one byte, so each color component may have a (decimal) value between 0 and 255. The fourth byte may be used to store other information about the element. Thus, for RGB images, threshold(s) 104 may include values for one or more (typically, for all three) of the color components. As an example, for a 32-bit RGB image, threshold(s) 104 may include, in decimal representation, the values (100, 150, 125) for the three color components.

Typically, objects to be segmented will not be uniform; in other words, the graphic components of elements within a desired object will typically not be uniform. Instead, for example, the color at individual elements within the object may vary over some range. Thus, threshold(s) 104 may also specify a tolerance range for the graphic component(s) under test, for example a tolerance range above or below one or more of the color component values of an element at the seed point 106. For example, a tolerance range of ±10%, or +10/−

5%, or some other range may be specified for values (100, 150, 125) of the three color components at the seed point 106. As another example, a minimum range may be specified, but no maximum range, or vice versa. For example, a minimum range of 5% below one or more of the color component values of an element at the seed point 106 may be specified, or alternatively a maximum range of 4% above one or more of the color component values of an element at the seed point 106 may be specified. When the region growing mechanism 110 is testing a particular element in image data 100, the graphic component(s) being tested of the element under test and of a portion or all of the elements within the test area defined by the radius 102 may be required to fall within the specified tolerance range of the graphic component(s) of the element at the seed point 106 for the particular element under test to be added to the region 120 being grown.

Note that information in color images may be stored in other formats than RGB format, and in other color resolutions than 32-bit. For example, HSI (Hue, Saturation, Intensity) format is an alternative to RGB format. Thus, threshold(s) 104 may be used that are tailored to the particular image format, for example, to the particular color format and to the particular color resolution.

In various embodiments, the value(s) of threshold 104 may be specified using one or more of several methods. For example, a portion or all of the threshold 104 values may be manually entered via a user interface. As another example, a user may select a seed point 106 within image data 100 as a starting point for the region growing mechanism 110. Threshold 104 values to be used may then be programmatically obtained or determined from an element at or near the selected seed point 106, or alternatively may be programmatically determined from two or more elements at or near the selected seed point 106, for example by averaging the values of the graphic components for the two or more elements that are to be used in testing elements in image data 100. Note that, if the seed point 106 is used to determine the value of threshold(s) 104, then threshold(s) 104 may not be input into region growing mechanism 110, but instead may actually be determined by region growing mechanism 110 from the input seed point 106.

As mentioned above, seed point 106 represents the starting point for the region growing mechanism 110 within image data 100. In various embodiments, the seed point 106 may be specified using one or more of several methods. In one embodiment, a user interface may be provided via which a user may select a seed point 106 within a displayed image. For example, the user may move the cursor over a desired starting location in a displayed image for the region growing mechanism 110, for example using a mouse, and select the location (e.g., by clicking a mouse button). Note that in 3-D image sets, the user interface may provide a mechanism whereby the user may view and select a particular slice, and select a point within the slice, to specify the seed point 106. Further note that, when the user clicks or otherwise selects a seed point within a displayed image, a coordinate in the coordinate system of the displayed image on the display screen is selected. This coordinate is then programmatically mapped into the coordinate system of the actual image data 100 to locate an element that is to be used as the seed point 106.

Region growing mechanism 110 receives the input digital image data 100, radius 102, threshold(s) 104, and seed point 106 and proceeds to grow the region 120 to thus segment (or locate) the desired object in image data 100. Note that, in FIG. 5, region 120 may represent either a region in 2-D image space or a volume in 3-D image space. In one embodiment, beginning at an element in image data 100 indicated by seed point 106, region growing mechanism 110 iteratively tests elements in image data according to the specified threshold(s) and, if a tested element passes the threshold test, the element is added to the region 120. In one embodiment, for an element under test to pass the threshold test, all elements within the test area defined by the radius 106 must also pass the threshold test.

In one embodiment, to initialize the region 120, an element in image data 100 indicated by seed point 106 is added to the region 120 as the first element in the region 120. Alternatively, to initialize the region 120, two or more elements indicated by seed point 106 may be added as first elements in the region 120. In one embodiment, the threshold test is not applied to the initial elements that are added to region 120; thus, the region 120 will not be empty. Alternatively, the threshold test may be applied to the initial element(s). Note that, if the test area-based test is applied to the initial element(s) that requires all elements within a test area defined by the radius 106 to pass the threshold test for the element under test to be added to the region 120, the region 120 may be empty if the initial element(s) do not pass the test.

After initializing the region 120, and assuming the region is not empty, connected elements to the region 120 (e.g., elements that are not in the region 120 but that are connected to elements in the region 120 according to the type of connectivity being used) that are available for testing may then be iteratively tested. Note that elements may be excluded from the set of elements available for testing, as described below. However, note that an element excluded from testing is only excluded from being the element under test, and is not excluded from being tested as one of the elements within the test area around a current element under test. Any of various methods may be used to indicate that an element is excluded from testing. For example, the element may be added to a separate "mask" region that includes all elements that are determined to not be included in region 120 (e.g., elements that fail the test area-based threshold test), and that are thus excluded from testing.

If a tested element passes the threshold test and all elements within the test area defined by the radius 106 pass the threshold test, the element is added to the region 120. If the tested element does not pass the test area-based threshold test, the element may be excluded from further testing so that the element is not tested again. The process may be continued until no more elements that are both connected to the region 120 and available for testing are found. The test area-based region growing process may be stated in exemplary outline form as follows:

---

Initialize region 120 with an element or elements at the seed point 104.
Repeat:
    Get an element connected to the region and available for testing.
    If an available and connected element is found:
        If the element passes the test area-based threshold test:
            Add the element to the region 120.
        Else if the element fails the test area-based threshold test:
            Exclude the element from further testing.
Until no more elements that are both connected to the region 120 and available for testing are found.

---

Once region growing mechanism 110 completes, a region 120 representing the segmentation of a desired object from image data 100 is an output. However, if the test area-based region growing mechanism 110 requires that all elements within the test area defined by radius 104 pass the threshold test, the region 120 (which may be a region in 2-D space or a volume in 3-D space) may only grow to within the radius 104 distance of the edge of the desired object in at least some places. This may result in an inset from the desired true edge of the object being segmented; elements within this edge inset will not be included in the region 120, even if the graphic components of the individual elements lie within the tolerance range of the threshold test. A test area defined by radius 104 that includes one or more elements beyond the edge of the desired object may fail the test area-based test if one or more of the elements in the test area do not pass the threshold test, and thus the element under test will not be included in the region 120 even if the element under test passes the threshold test.

Thus, embodiments of a dilation mechanism 130 may be used to perform post-processing of the original region 120 to correct for such an edge inset. The dilation mechanism 130 may receive, but is not limited to, image data 100, region 120, radius 102, and threshold(s) 104 as input, and may output, but is not limited to, expanded region 140. Again note that region 120 and region 140 may represent either a region in 2-D image space or a volume in 3-D image space. The dilation mechanism 130 performs a morphological dilate as described below to expand the original region 120 to the proper edge of the desired object in the image data 100 within the tolerance range of the threshold(s) 104, outputting expanded region 140, and thus corrects for the inset error introduced by the test area radius 102 used by the region growing mechanism 110. The dilation mechanism 130 may be limited to expanding region 140 to no more than the radius 102 distance from the edge of the original region 120 generated by the region growing mechanism 110. Limiting the expansion to no more than the radius 102 distance from the edge of the original region 120 may help prevent the region 140 from being grown down undesirable connective pathways.

Embodiments of the dilation mechanism 130 implement a dilation method that iterates over elements in at least a portion of the image data 100 set (the set of all elements in the 2-D or 3-D image) and adds elements to the edge of the region 140, or rejects elements, in accordance with a set of one or more rules or tests for inclusion in the region 140. In one embodiment, each iteration may expand the edge of the region 140 by one element. The one or more rules or tests for inclusion may include, but are not limited to:

A distance test: Elements that are beyond the distance of the radius 104 used by the region growing mechanism 110 from the edge of the original region 120 generated by the region growing mechanism 110 are not added to the region 140.

A connectivity test: Elements that are not connected to an element in the region 140 are not added to the region 140. Note that determining whether an element is connected to another element depends on the type of connectivity being used. For example, in 2-D image space, four-connectivity or eight-connectivity may be used. In 3-D image space, six-connectivity, 26-connectivity, or possibly some other connectivity level or rule may be used.

A threshold test: Elements for which one or more of the associated graphic components do not pass the threshold test for the region are not added to the region or volume. In one embodiment, the threshold test and threshold 104 value(s) used by the region growing mechanism 100 to grow the original region 110 are also used by the dilation mechanism 130. However, the dilation mechanism 130 performs the threshold test on individual elements, and does not use a test area defined by the radius 102 as does the region growing mechanism 110.

In other words, embodiments of the dilation mechanism 130 may iterate over or otherwise examine at least a portion of the elements in the image data 100 set to locate elements that are connected to elements that are already included in the region 140 according to a connectivity rule being used. If an element is found that is not included in the region 140 and that is connected to an element that is included in the region 140 (according to the type of connectivity being used), and if the location of the element, as determined by its coordinates in the image space, is within the distance of the radius 102 from the edge of the original region 120 generated by the region growing mechanism 110, and if the graphic component(s) of the element pass the threshold test, the element is added to the region 140. Otherwise, the element is not added to the region 140. In addition, the element may be, but is not necessarily, excluded from further testing to prevent the dilation mechanism 130 from testing the element again. Thus, iterations of the dilation mechanism 130 may tend to add one layer of elements to the edge of region 140, expanding the edge of the region 140 from the original region 120 out to the limit of the radius 102 used by the region growing mechanism 110 to grow the original region 120.

In one embodiment, a subset of the elements in the image space to be tested in iterations of the dilation mechanism 130 may be determined before beginning the iterations. This limits the elements to be tested by the dilation mechanism 130 to a subset of the elements in image data 100. In one embodiment, a copy of original region 120 may be generated as an initial region 140, which may then be expanded by the dilation mechanism 130.

Note that the edge of a region may be considered a curve, and the edge of a volume may be considered a surface. In one embodiment, for regions in 2-D space, before iterating over the set of elements to be tested, a curve may be fit to the edge of an original region (region 120) found by the region growing mechanism 110. Similarly, for volumes in 3-D space, a surface may be fit to the edge of an original volume (region 120) found by the region growing mechanism 110. The determined curve or surface may then be used during iterations of the dilation mechanism 130 in performing the distance test for elements being tested. Mathematical methods for determining the minimum distance of a point to a curve in 2-D space or to a surface in 3-D space are well-known and available, and any such method may be implemented by dilation mechanism 130 to perform the distance test.

For example, a set of pixels constituting the edge or boundary of a region in 2-D image space may be determined. One method of finding an edge or boundary of a region is to exhaustively iterate over the pixels that are included in the region 120 found by the region growing mechanism 110, testing each pixel to determine if the pixel has at least one connecting pixel that is not included in the region 120. Any such pixel would be considered to be on the edge of the region 120. Note that four-connectivity may be used in this test so that diagonally-connected pixels are not considered. Another method of finding an edge or boundary of a region is to locate one pixel on the edge of the region, and then apply a boundary tracking technique to find the boundary. Other image processing methods of finding an edge or boundary of a region are available, and any such method may be used in various embodiments.

Once the set of edge pixels (the boundary) is determined, a curve may be fit to the set of edge pixels. In one embodiment, the curve may be expressed as a polynomial. Any one of several mathematical methods to find the minimum distance to the curve, expressed as a polynomial, may then be used in the distance test. Note that other mathematical methods than the polynomial method may be used to find the minimum distance of a point (an element) to a curve (the edge of the region 120).

Note that similar mathematical and/or morphological methods to those described above, or other methods, may be used or adapted to find the surface of a volume in 3-D image space and to find the minimum distance of a voxel to the surface of the volume.

In one embodiment, the determined curve or surface may also be used in determining a subset of the elements (a search area) in the image space (image data 100) to be tested in iterations of the dilation mechanism 130. For example, minimum and maximum points on the x and y axes of the curve fit to a region may be found. Similarly, minimum and maximum points on the x, y, and z axes of the surface fit to a volume may be found. The radius, or radius+1, may be added to or subtracted from the minimum/maximum points as appropriate to find an outer boundary for a search area. Note that the region 120 may be used to "mask" the search area—only elements that are in the search area but not in region 120 may be included in the search area.

In one embodiment, if an element initially fails the connectivity test and thus is not initially added to region 140, the element may be left in a set of elements to be tested and thus may later be reconsidered for inclusion in region 140 if connecting elements to the element are added to the region 140. In one embodiment, if an element initially fails the distance test or threshold test, the element may be excluded from the set of elements being tested so that the element is not retested in later iterations.

FIGS. 8A through 8H graphically represent an image segmentation process that implements a region growing mechanism that uses a test area defined by a radius to grow a region and a dilation mechanism to extend the region to correct for the edge inset left by the region growing mechanism, according to one embodiment. Note that the image segmentation process illustrated in FIGS. 8A through 8H may be used to grow regions in 2-D image space or volumes in 3-D image space; therefore, the regions and test areas depicted in these Figures may represent either regions in 2-D image space or volumes in 3-D image space.

Figure 8A:
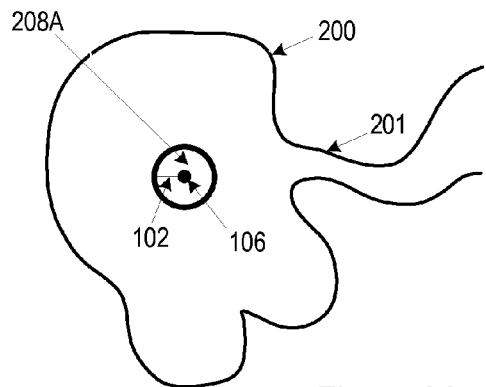

FIGS. 8A through 8D graphically represent the operation of a region growing mechanism such as region growing mechanism 110 of FIG. 5. FIG. 8A shows the outline of a desired object 200 in image space. Note the narrow connecting pathway 201. A user of the image segmentation process may desire that the region growing mechanism 110 not grow the region down pathway 201 or similar connecting pathways. Thus, a test area-based region growing mechanism 110 may be used. A radius 102 that may be used to define the test areas 208 may be specified, for example via user input to a user interface of the image segmentation process. The radius 102 may be specified so that the diameter of the test area 208 defined by the radius 102 is greater than the width of pathway 201. A seed point 106 may be specified using one or more of several methods as previously described for FIG. 5, for example via user input to a user interface of the image segmentation process. Seed point 106 represents the starting point for the region growing mechanism within object 200. Threshold values to be used in testing the graphic components of elements to determine if the elements qualify for inclusion in a region being grown may be determined from an initial element or elements at or near the specified seed point 106, or alternatively may be otherwise specified or determined, for example via user input to a user interface of the image segmentation process.

The region growing mechanism 110 may initialize a region to be grown (region 120, not shown in FIG. 8A). In one embodiment, one or more elements at or near the seed point 106 may be added as initial elements in the region 120. In one embodiment, a test area-based threshold test is applied to an initial element at seed point 106. The radius is used to determine a test area 208A around the element. In one embodiment, all elements within this test area 208A must also pass the threshold test for the element under test (the initial element at the seed point) to be added to the region. If the element does not pass the test area-based threshold test, the element is not added to the region 120. If the element does pass the test, the element is added to the region. Note that in one embodiment, the initial element may not be required to pass the test area-based threshold test, and is simply added to the region 120 to initialize the region.

Figure 8B:
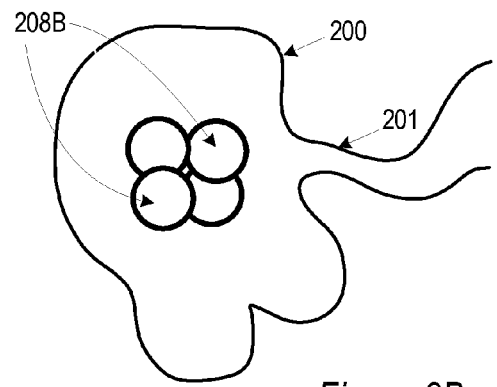
Figure 8C:
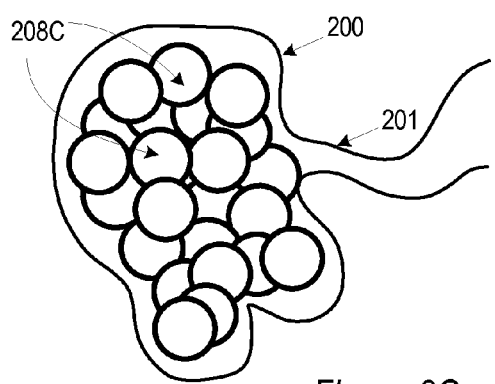
Figure 8D:
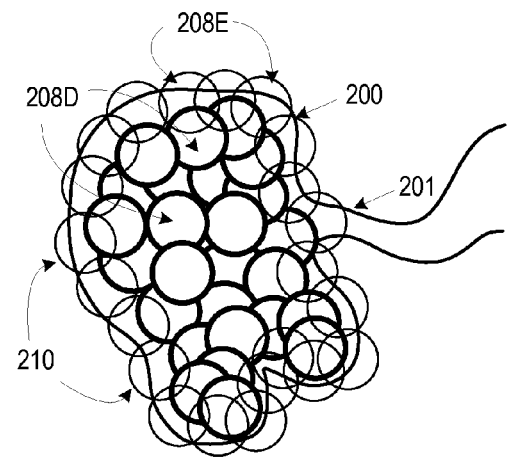

FIGS. 8B and 8C graphically illustrate the growing of region 120 using the test area-based region growing mechanism 110. After initializing the region to be grown (region 120, not shown in FIGS. 8A through 8C), and assuming the region is not empty, connected elements to the region 120 (e.g., elements that are not in the region 120 but that are connected to elements in the region 120 according to the type of connectivity being used) and that are available for testing may then be iteratively tested using the test area-based threshold test. If a tested element passes the threshold test and all elements within the test area 208 defined by the radius 102 pass the threshold test, the element is added to the region 120. If the tested element does not pass the test area-based threshold test, the element may be excluded from further testing so that the element is not tested again. The process may be continued until no more elements that are both connected to the region 120 and available for testing are found. FIG. 8B illustrates a few test areas 208B early in the region growing mechanism. Region 120 at this point would roughly encompass the center points of the test areas 208B. In this example, the elements under test in the test areas 208B would all pass the test area-based threshold test. FIG. 8C illustrates more test areas 208C later in the region growing mechanism. Region 120 at this point would roughly encompass the center points of the test areas 208C. In this example, the elements under test in the test areas 208C would all pass the test area-based threshold test. FIG. 8D graphically illustrates the region being grown at or near the conclusion of the operation of the region growing mechanism. Test areas 208D, shown with their borders bolded, represent test areas that have passed the test area-based threshold test. The elements under test in test areas 208D (i.e., the center element in each test area 208D) are all added to region 120. Test areas 208E, shown with their borders not bolded, represent test areas that have failed the test area-based threshold test. These test areas 208E all include at least one element that is outside the actual edge of object 200, and thus fail the test area based threshold test, thus excluding the element under test from being added to region 120. Essentially, any element under test that is within the radius 102 distance of the actual edge of the desired object 200 may fail the test area-based threshold test if the test area 208 around the element includes one or more elements that fail the threshold test, even if the element under test passes the threshold test.

Figure 8E:
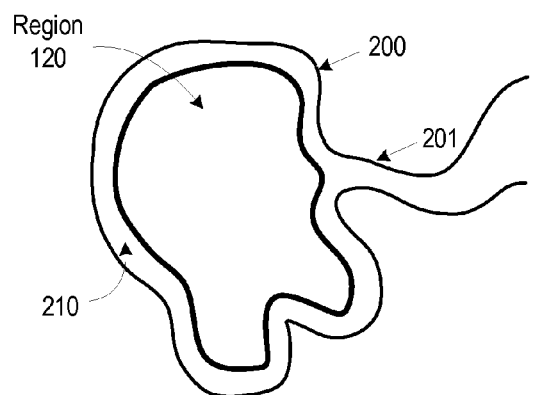

FIG. 8E graphically illustrates the resultant region 120 that is generated by the test area-based region growing mechanism 110. Note the edge inset 210 from the actual edge of the desired object 200 that is introduced by the use of a test area-based threshold test. This edge inset 210 may be inset from the actual edge of the desired object by approximately the radius distance.

Figure 8H:
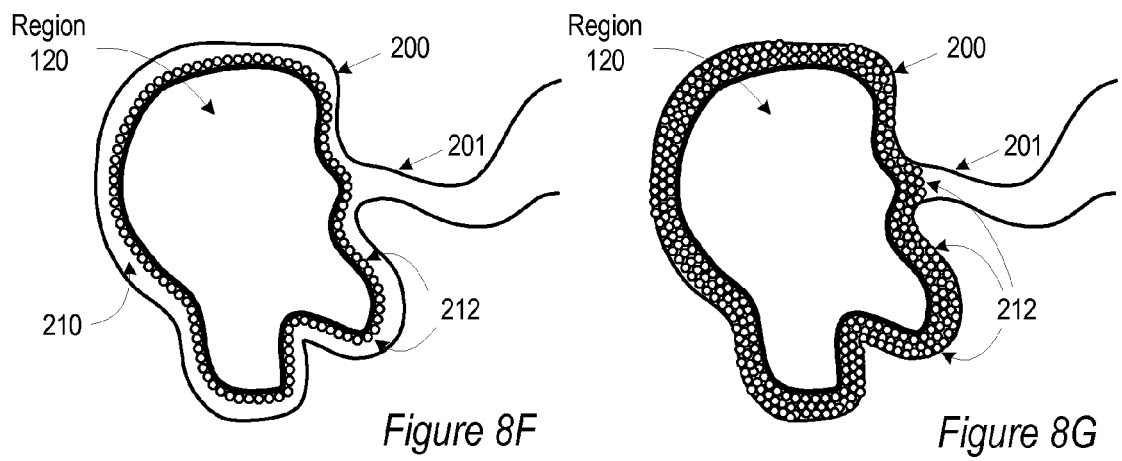
Figure 8H:
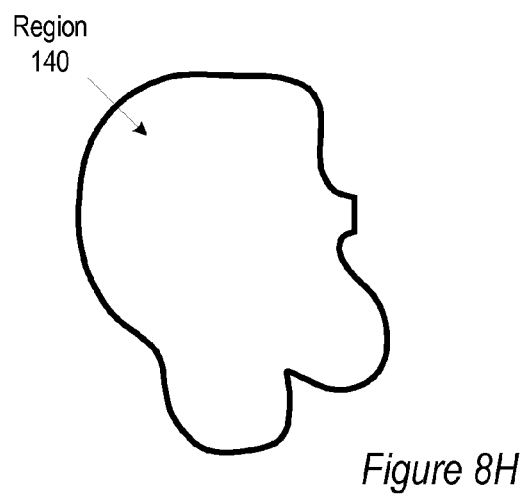

FIGS. 8F through 8H graphically illustrate the post-processing performed by a dilation mechanism, such as dilation mechanism 130 of FIG. 5, to correct for such an edge inset 210, according to one embodiment. Embodiments of the dilation mechanism 130 implement a dilation method that iterates over elements in at least a portion of the image data set (the set of all elements in the 2-D or 3-D image) and adds elements to the edge of the region being grown, or rejects elements, in accordance with a set of one or more rules or tests for inclusion in the region. The one or more rules or tests were previously described for FIG. 5.

In one embodiment, the dilation mechanism 130 may iterate over or otherwise examine at least a portion of the elements in the image data set to locate elements that are connected to elements that are already included in the region being grown according to a connectivity rule being used. If an element is found that is not included in the region and that is connected to an element that is included in the region, and if the location of the element, as determined by its coordinates in the image space, is within the radius 102 distance from the edge of the original region generated by the region growing mechanism 110, and if the graphic component(s) of the element pass the threshold test, the element is added to the region being grown. Otherwise, the element is not added to the region being grown. In addition, the element may be, but is not necessarily, excluded from further testing to prevent the dilation mechanism 130 from testing the element again. Thus, iterations of the dilation mechanism 130 may tend to add one layer of elements to the edge of the region being grown, expanding the edge of the region from the original region generated by the region growing mechanism out to the limit of the radius 102 used by the region growing mechanism 110 to grow the original region.

In FIG. 8F, a first iteration of dilation mechanism 130 has added one layer of elements 212 within edge inset 210 to the original region 120 generated by the region growing mechanism 110. In FIG. 8G, further iterations of dilation mechanism 130 have continued to add elements 212 to region 120, growing the region out from the edge of the original region 120 to the extent of the radius 102, thus filling the edge inset 210. Note, however, that the rule that excludes elements 212 that fail the distance test from being added to the region 120 prohibits the region 120 from being grown down the connecting pathway 201. FIG. 8H graphically illustrates the resultant expanded region 140 generated from the original region 120 by the dilation mechanism 130. Note that the region 140 closely matches the true edge of the desired object 200, but does not extend down pathway 201.

Figure 9:
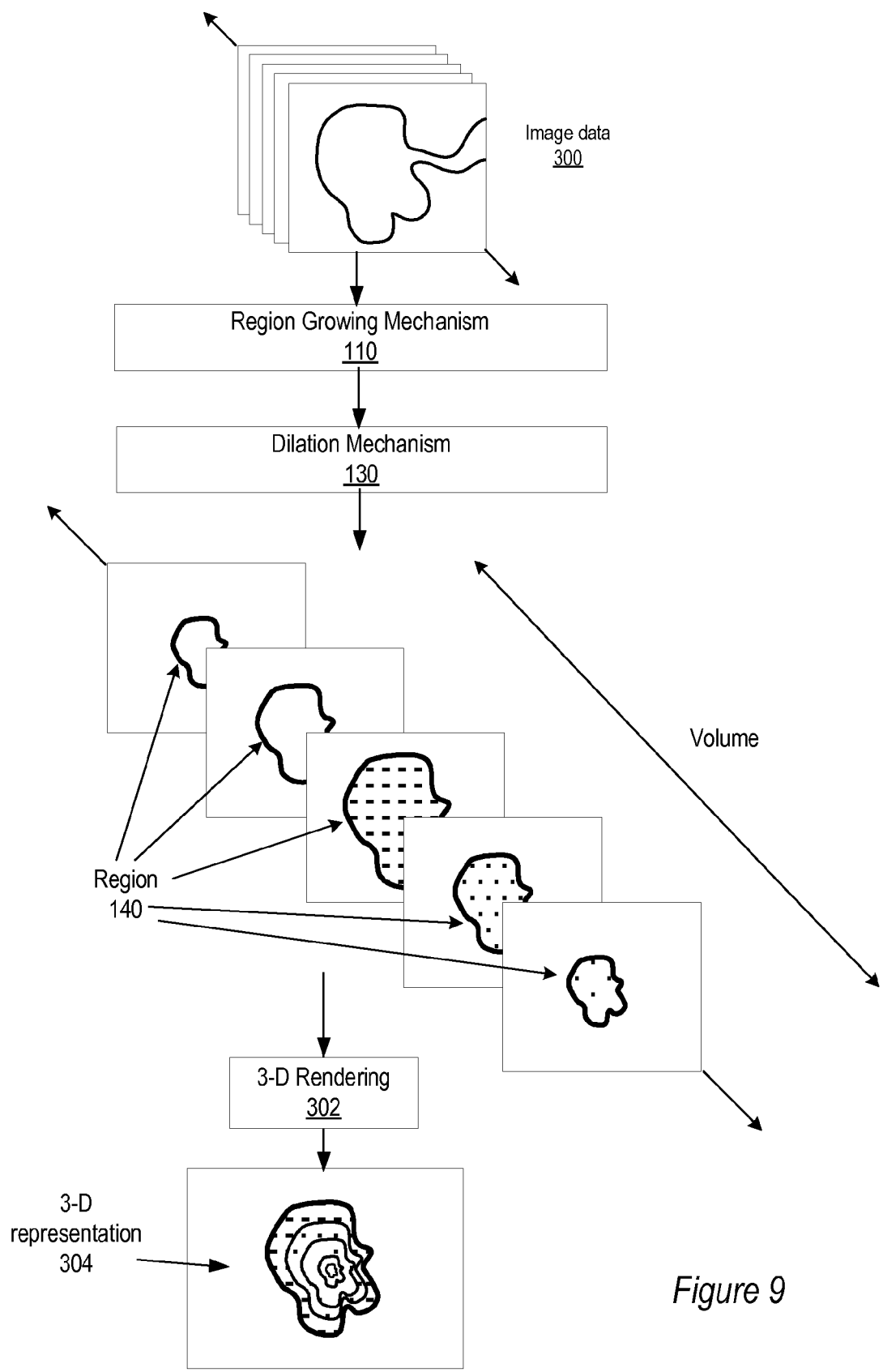
FIG. 9 illustrates an image segmentation process that implements a region growing mechanism and a dilation mechanism as described herein to grow a volume in 3-D image space, according to one embodiment.

FIG. 9 illustrates an image segmentation process that implements a region growing mechanism and a dilation mechanism as described herein to grow a volume in 3-D image space, according to one embodiment. FIG. 9 further illustrates the volume generated by the 3-D process used to render a 3-D representation of an object of interest. Image data 300 represents a 3-D digital image data set that is to be segmented using embodiments of an image segmentation process as described herein. Image data 300 may be any type of 3-D digital images from any field, and may be captured via any type of 3-D digital image capturing technology. As an example, image data 300 may be medical 3-D image sets including a number of "slices" such as images generated by an MRI, CT Scan, or other 3-D medical imaging technology.

Region growing mechanism 110 may operate to grow an original volume as previously described in FIG. 5 through FIG. 8H (note again that region 120 and region 140 in FIG. 5 and FIGS. 8A through 8H may represent volumes in 3-D image space). Dilation mechanism 130 may operate to expand the original region 120 to generate expanded region 140 by adding connected elements that pass the threshold test to the volume up to the limit of the radius used by the region growing mechanism 110. Note that each image or "slice" essentially includes a 2-D region generated by the image segmentation process; the combination of the 2-D regions constitute the volume (region 140) in 3-D image space. The 2-D regions constituting the volume may be thought of as "slices" of the volume. A 3-D rendering process 302 may then receive region 140 as input and render the input into a 3-D representation 304 of the object of interest.

Figure 10:
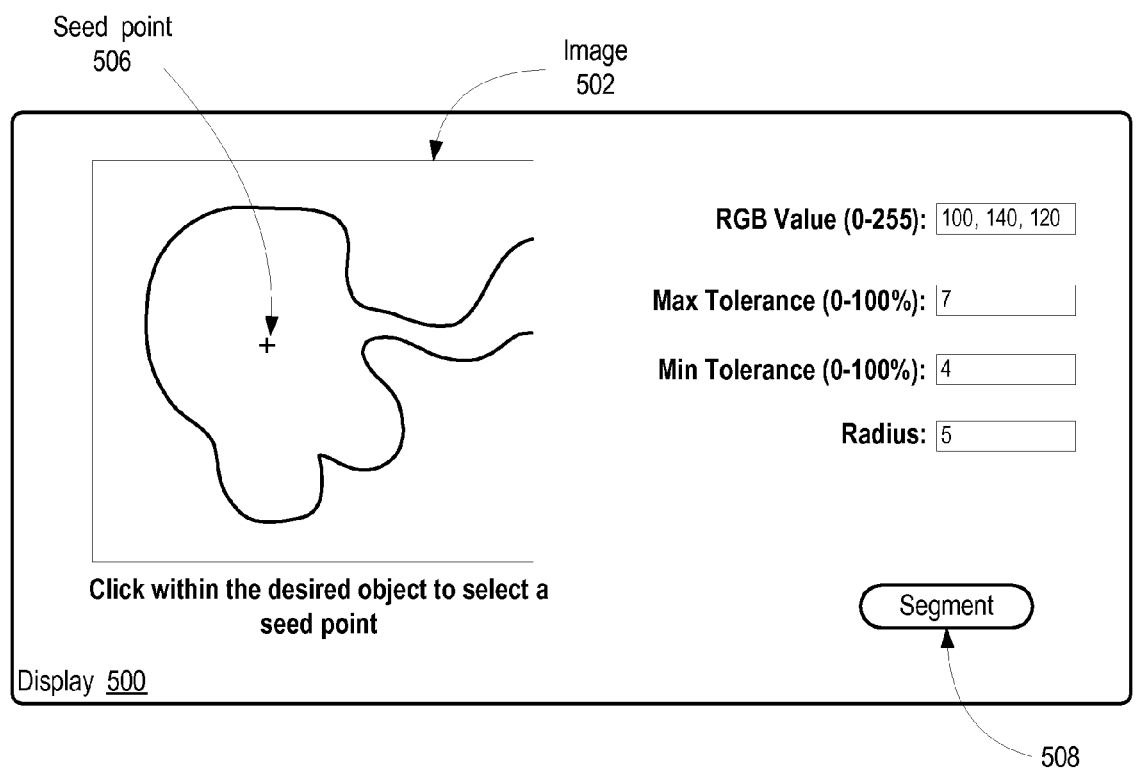
FIG. 10 illustrates an exemplary user interface to an image segmentation process including a region growing mechanism and a dilation mechanism as described herein.

FIG. 10 illustrates an exemplary user interface to an image segmentation process including a region growing mechanism and a dilation mechanism as described herein. Note that display 500 is exemplary, and is not intended to be limiting. Display 500 may include an image 502. Image 502 is a display of the digital image data that is to be segmented using embodiments of an image segmentation process as described herein. Image 502 may be a 2-D image or a "slice" (one image) from a 3-D image set. In 3-D image sets, the user interface may provide a mechanism whereby the user may select a particular slice to be displayed as image 500. Further, in 3-D image sets, the user interface may concurrently display two or more slices from the image set.

Seed point 506 represents the starting point for the region growing mechanism within image 502. In one embodiment, the user interface may allow the user to select the seed point 506 within the displayed image 502. For example, the user may move the cursor over a desired starting location in the displayed image 502, for example using a mouse or other cursor control device, and then select the location (e.g., by clicking a mouse button). When the user clicks or otherwise selects a seed point 506 within displayed image 502, a coordinate in the coordinate system of the displayed image on the display screen is selected. This coordinate may then be programmatically mapped into the coordinate system of the actual image data to locate an element that is to be used as the seed point 506.

Relevant graphic values for the element at the selected seed point 506 may be displayed on the user interface. For example, exemplary display 500 includes a field that textually displays the RGB values for the element at the seed point 506. The user interface may also include one or more user interface items for entering threshold values, the radius and possibly other variables. Exemplary display 500 includes two text entry boxes for entering a minimum and maximum value for a range around the graphic component(s) to be tested. In this example, the minimum and maximum values may be entered as percentages. One of ordinary skill in the art will recognize that other methods for specifying the threshold values may be used. Exemplary display 500 includes a text entry box for specifying a radius to be used in defining a test area by the region growing mechanism and by the dilation mechanism as a limit on expansion of the region. One of ordinary skill in the art will recognize that other methods for specifying the radius may be used. As previously described, the radius may be entered in standard units of measurement (e.g., millimeters) and then converted to elements per unit, or alternatively may be entered as the number of elements. Note that, as an alternative to specifying a radius for the test area, a diameter for the test area may be specified.

The user interface may include a user interface item for launching the image segmentation process. For example, display 500 includes a user-selectable "Segment" button 508 that launches the image segmentation process with the specified seed point 506, radius, and threshold values as input.

Figure 11:
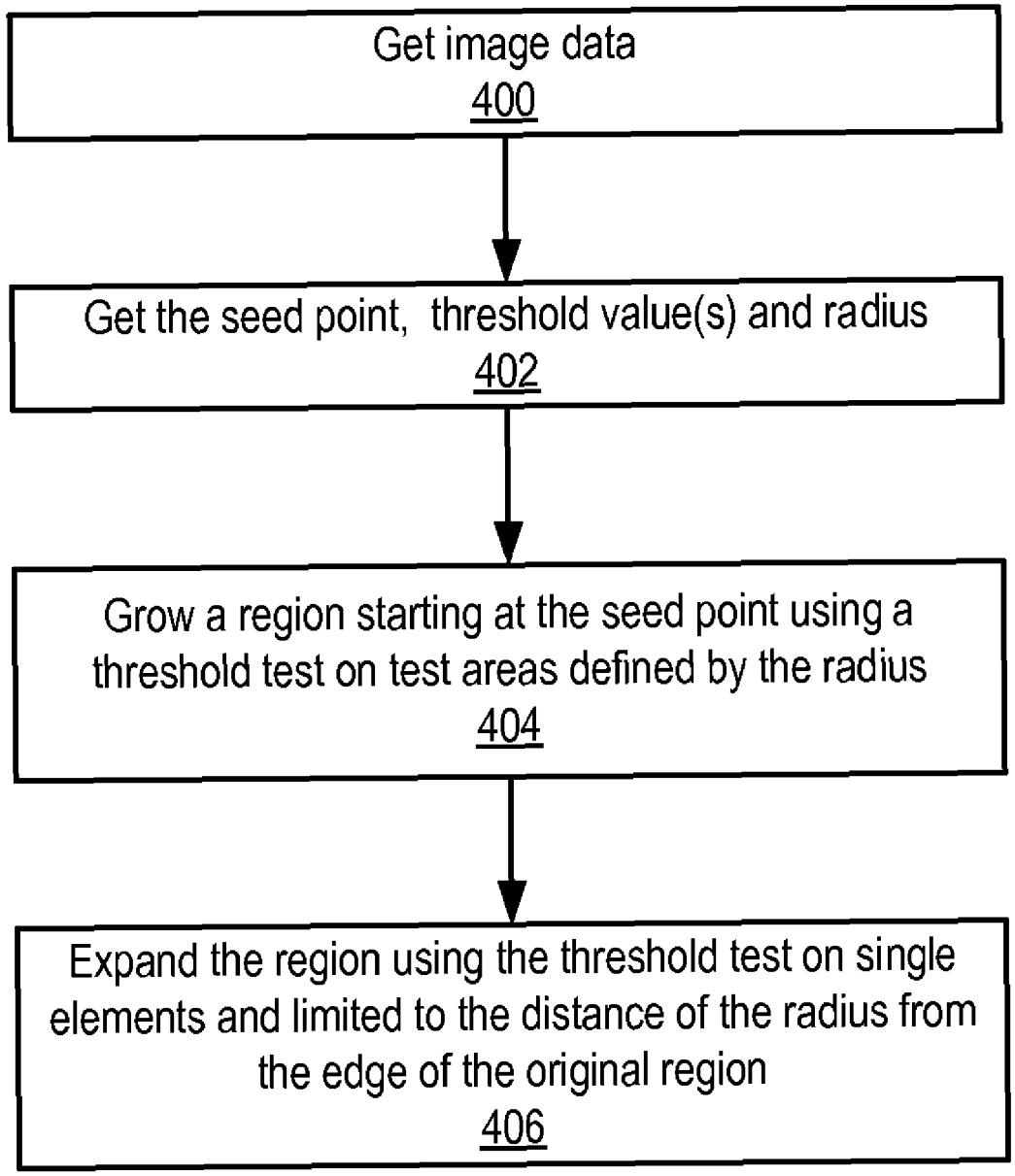
FIG. 11 is a flowchart of an image segmentation method that includes a test area-based region growing mechanism and a dilation mechanism according to one embodiment.

FIG. 11 is a flowchart of an image segmentation method that includes a test area-based region growing mechanism and a dilation mechanism according to one embodiment. As indicated at 400, image data may be received. Image data may be a 2-D image or a 3-D image set, as previously described. As indicated at 402, a seed point, threshold value(s), and radius may be specified, for example via user input to a user interface such as the exemplary user interface of FIG. 10.

As indicated at 404, a test area-based region growing mechanism may be initiated that may grow a region starting at the seed point and using a threshold test in accordance with the threshold value(s) on test areas defined by the radius. Note that the region may be a region in 2-D image space or a volume in 3-D image space, and the test area may be a region in 2-D image space or a volume in 3-D image space. In one embodiment, a test area containing two or more elements may be defined by the radius around a current element under test. In one embodiment, all of the elements in the test area must pass the threshold test for the element under test to be added to the region. This process is repeated to test connected elements to the region until the set of elements available for testing are exhausted. This may prevent the region growing mechanism from extending the region being grown down undesirable narrow pathways, but may have the side effect of leaving an edge inset between the edge of the region and the true edge of the object of interest.

To correct for the edge inset, a dilation mechanism may perform post-processing of the original region generated by the region growing mechanism. As indicated at 406, the dilation mechanism may expand the region by applying the threshold test on single elements connected to the region being grown and limited to the distance of the radius from the edge of the original region. In other words, only elements that are within the distance of the radius from the edge of the original region generated by the region growing mechanism may be (but are not necessarily) added to the region being grown. Note that 406 is described in more detail in FIG. 12.

Figure 12:
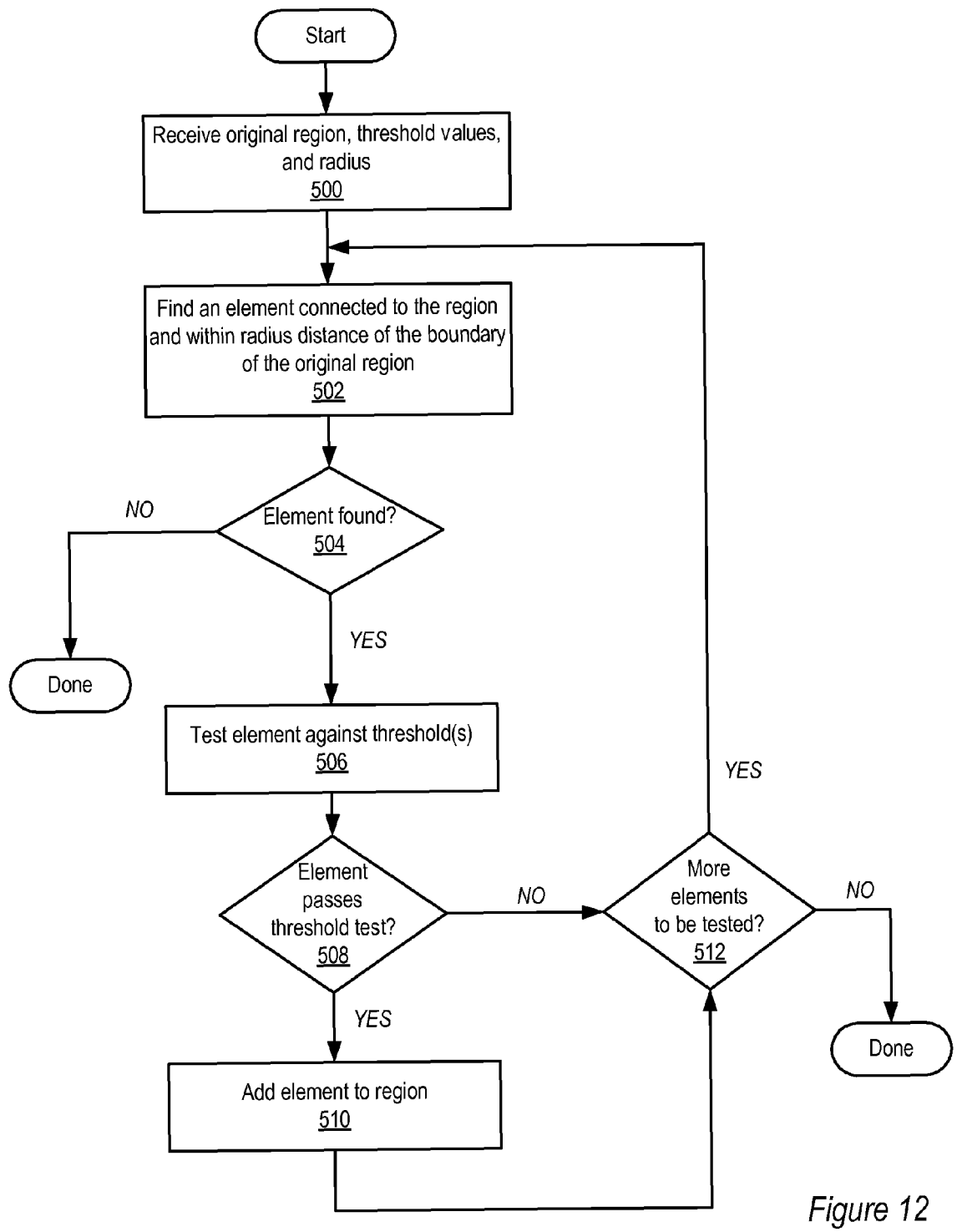
FIG. 12 is a flowchart of a dilation method implemented by a dilation mechanism according to one embodiment.

FIG. 12 is a flowchart of a dilation method implemented by a dilation mechanism according to one embodiment. Note that FIG. 12 provides more detail to item 408 of FIG. 11. As indicated at 500, a dilation mechanism may receive an original region generated by a test area-based region growing mechanism, one or more threshold values, and a radius that was used by the region growing mechanism. Note that the original region may be a region in 2-D image space or a volume in 3-D image space. The dilation mechanism may iterate over a set of elements available for testing to expand the original region (or a copy of the original region) to fill the edge inset left by the test area-based region growing mechanism. As indicated at 502, the dilation mechanism may attempt to find, in a set of elements to be tested, an element connected to the region being grown (according to the type of connectivity being used) and within radius distance of the edge of the original region generated by the region growing mechanism. At 504, if no such element is found, the dilation mechanism is done. At 504, if an element is found that is connected to the region being grown and that is within the radius distance of the edge of the original region, the dilation mechanism may then test the graphic component(s) of the element against the input threshold value(s), as indicated at 506. At 508, if the element passes the threshold test, the element is added to the region being grown, as indicated at 510. At 512, if there are more elements in the set of elements available for testing, the dilation mechanism may return to 502 to find a next element for testing. If there are no more elements available for testing, the dilation mechanism is done.

Bitmaps and Similar Structures

Embodiments of the image segmentation process including a dilation mechanism 130 as described herein may need to temporarily or permanently store image processing information for various purposes. Note that one method that is commonly used in image processing to store information, such as the edge or boundary information for regions and volumes as described above, is by using what are commonly referred to in image processing as bitmaps, or similar data structures. A bitmap is essentially, for a 2-D image, an h*w storage space, where h is the height of the image and w the width. For a 3-D image, a bitmap would be an h*w*d storage space, where h is the height of the images, w the width, and d the depth (the total number of images or "slices" in the 3-D data set). Whereas the actual color or grayscale image requires multiple bytes to store graphic and other information for each image element, a bitmap uses only one bit to store information about a particular element location. For example, an exemplary 2-D image with the dimensions 1024 (w)*768 (h) would require the allocation of 786,432 bits (98,304 bytes) for a bitmap. An exemplary 3-D image set containing five "slices" each represented by one such 1024*768 image would require the allocation of 5*786,432 bits, or 491,520 bytes.

Indexing into a bitmap is simple. For example, in the exemplary 1024*768 image, there are 768 "rows", typically indexed as rows 0 to 767, and there are 1024 "columns", typically indexed as columns 0 to 1023. The 786,432 bits, each representing a particular pixel, are typically indexed as bits 0 to 786,431. Note that information may be stored in a bitmap in column order or in row order. If the bitmap is in row order, then the first 1024 bits represent the first row, the second 1024 bits the second row, and so on. If the bitmap is in column order, then the first 768 bits represent the first column, the second 768 bits represent the second column, and so on. To index to a particular bit corresponding to a particular pixel, using row order as an example, an exemplary indexing formula is simply:

(row number*width)+column number where row number and column number are obtained from the coordinates of the particular pixel, and assumes that the pixel coordinates are also zero-based. Width is the width of the image, and thus is the same as the number of columns; it could also be referred to as the row length. Thus, a particular bit in a bitmap ImageBitmap may be indexed by something similar to the following piece of pseudocode:

ImageBitmap[(pixel.row_number*num_columns)+
pixel.column_number]

This indexing may be used, for example, to set or clear a particular bit in the bitmap, or to read a particular bit from the bitmap. Also note that a similar indexing method that takes into account the depth (i.e., slice number) may be used to index into bitmaps or similar structures for 3-D image sets. The slices may, for example, be indexed from 0 to N. To index to a particular bit corresponding to a particular voxel in the 3-D image set, using row order as an example, an exemplary indexing formula is simply:

((slice number*slice size)+(row number*width))+
column number where slice number represents the particular (2-D) image in the 3-D data set that includes the voxel, and slice size represents the number of voxels in each slice (e.g., 786,432, in a 1024*768 image or "slice").

Note that the same or similar indexing methods may be used to address the elements in the images, for example the pixels in 2-D images or voxels 3-D image sets.

Note that similar data structures to the bitmaps described above but that use more space than one bit to store information for each image element location may be used. For example, information may be stored for each element in an image in two bits, half a byte, a byte, two bytes, and so on. The indexing methods described above may be modified to address bits, portions of bytes, bytes, or so on, in such data structures.

In addition to the boundary or edge information, a bitmap or similar data structure may be used to mark whether particular pixels are included in (or excluded from) a region being grown, to mark whether particular voxels are included in (or excluded from) a volume being grown, and for other purposes during the region growing mechanism and/or dilation process as described herein. Bitmaps or similar data structures may also be used for many other purposes; for example, a bitmap storing boundary information for a region or volume may be used to draw a representation of the boundary on a display screen or printout, a bitmap may be used in extracting data (e.g., a subset of pixels or voxels) from an image data set, and so on.

Exemplary System

Figure 13:
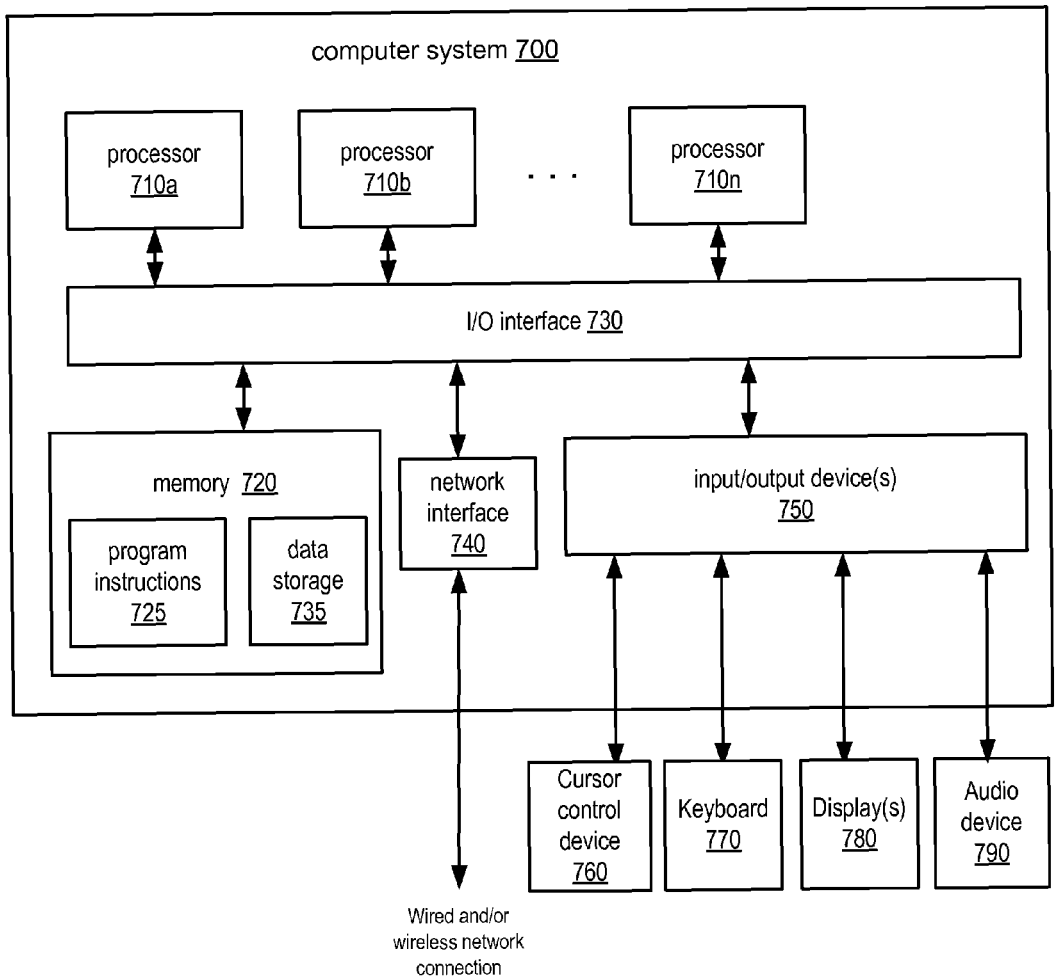
FIG. 13 illustrates an exemplary computer system on which embodiments may be implemented.

Various embodiments of a an image segmentation process including a region growing mechanism and dilation mechanism as described herein may be executed on one or more computer systems, which may interact with various other devices. One such computer system is illustrated by FIG. 13. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for an image segmentation process including a region growing mechanism and dilation mechanism as described herein, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 13, memory 720 may include program instructions 725, configured to implement embodiments of an image segmentation process including a region growing mechanism and dilation mechanism as described herein as described herein, and data storage 735, comprising various data accessible by program instructions 725. In one embodiment, program instructions 725 may include software elements of an image segmentation process including a region growing mechanism and dilation mechanism as illustrated in FIG. 5 and in FIG. 9. Data storage 735 may include data that may be used in some embodiments. In other embodiments, different software elements and data may be included.

Those skilled in the art will appreciate that computer system 700 is merely illustrative and is not intended to limit the scope of the image segmentation process including a region growing mechanism and dilation mechanism as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
generating a region comprising a subset of image elements within an object of interest in an image data set, wherein the region is generated by an image segmentation mechanism that leaves an edge inset between a boundary of the region and a true edge of the object of interest; and
extending the region generated by the image segmentation mechanism to generate an extended region including at least a portion of image elements in an area defined by the edge inset;
wherein said extending the region comprises limiting the extension of the region to a specified distance from the outer boundary of the original region generated by the image segmentation mechanism, wherein said limiting comprises iteratively testing individual image elements to determine if the individual image elements are within the specified distance from the outer boundary of the original region generated by the image segmentation mechanism.

2. The method as recited in claim 1, wherein said extending the region generated by the image segmentation mechanism further comprises:
for each element in a set of image elements to be tested that includes at least the image elements in the area defined by the edge inset:
getting an element that is connected to at least one element currently in the extended region, wherein the extended region includes the elements in the original region generated by the image segmentation mechanism and all elements that have been added to the original region; and
adding the element to the extended region if the element is within the specified distance from the boundary of the original region generated by the image segmentation mechanism and if one or more graphic components of the element are within a specified range of one or more specified thresholds for the graphic components.

3. The method as recited in claim 1, wherein said extending the region generated by the image segmentation mechanism further comprises:
for each element in a set of image elements to be tested that includes at least the image elements in the area defined by the edge inset:
applying a connectivity test to the element, wherein said connectivity test determines if the element is connected to at least one element currently in the extended region, wherein the extended region includes the original region generated by the image segmentation mechanism and all elements that have been added to the original region;
applying a distance test to the element if the element passes the connectivity test, wherein said distance test determines if the element is within the specified distance from the boundary of the original region generated by the image segmentation mechanism;
applying a threshold test to the element if the element passes the connectivity test and the distance test, wherein said threshold test determines if one or more graphic components of the element are within a specified range of one or more specified thresholds for the graphic components; and
adding the element to the extended region if the element passes the threshold test.

4. The method as recited in claim 1, wherein said image segmentation mechanism is a test area-based region growing mechanism, wherein a test area is defined by a specified radius, and wherein said test area-based region growing mechanism adds elements to a region being grown using a threshold test that determines if one or more graphic components of an element under test and of all elements within a test area defined by the radius around the element under test are within a specified range of one or more specified thresholds for the graphic components.

5. The method as recited in claim 4, wherein the specified distance is the radius used by the test area-based region growing mechanism.

6. The method as recited in claim 1, wherein the image data set is a two-dimensional image, wherein the image elements are pixels, and wherein the region is a two-dimensional region within the two-dimensional image.

7. The method as recited in claim 6, wherein the two-dimensional image is a medical image.

8. The method as recited in claim 1, wherein the image data set is a three-dimensional image set comprising a plurality of slices, wherein each slice is represented by a two-dimensional image, wherein the image elements are voxels, and wherein the region and the extended region are three-dimensional volumes within the three-dimensional image set.

9. The method as recited in claim 8, wherein the three-dimensional image set is a medical image.

10. The method as recited in claim 8, wherein the three-dimensional image set is captured using one of Magnetic Resonance Imaging (MRI), computed tomography (CT), positron emission tomography (PET), ultrasound, and X-Ray.

11. A system, comprising:
  at least one processor; and
  a memory comprising program instructions, wherein the program instructions are executable by the at least one processor to implement:
    an image segmentation mechanism configured to generate a region comprising a subset of image elements within an object of interest in an image data set, wherein the image segmentation mechanism leaves an edge inset between a boundary of the region and a true edge of the object of interest; and
    a dilation mechanism configured to extend the region generated by the image segmentation mechanism to generate an extended region including at least a portion of image elements in an area defined by the edge inset;
  wherein said dilation mechanism is further configured to limit the extension of the region to a specified distance from the outer boundary of the original region generated by the image segmentation mechanism, wherein said limiting comprises iteratively testing individual image elements to determine if the individual image elements are within the specified distance from the outer boundary of the original region generated by the image segmentation mechanism.

12. The system as recited in claim 11, wherein, to extend the region generated by the image segmentation mechanism, the dilation mechanism is further configured to:
  for each element in a set of image elements to be tested that includes at least the image elements in the area defined by the edge inset:
    get an element that is connected to at least one element currently in the extended region, wherein the extended region includes the elements in the original region generated by the image segmentation mechanism and all elements that have been added to the original region;
    add the element to the extended region if the element is within the specified distance from the boundary of the original region generated by the image segmentation mechanism and if one or more graphic components of the element are within a specified range of one or more specified thresholds for the graphic components.

13. The system as recited in claim 11, wherein, to extend the region generated by the image segmentation mechanism, the dilation mechanism is further configured to:
  for each element in a set of image elements to be tested that includes at least the image elements in the area defined by the edge inset:
    apply a connectivity test to the element, wherein said connectivity test determines if the element is connected to at least one element currently in the extended region, wherein the extended region includes the original region generated by the image segmentation mechanism and all elements that have been added to the original region;
    apply a distance test to the element if the element passes the connectivity test, wherein said distance test determines if the element is within the specified distance from the boundary of the original region generated by the image segmentation mechanism;
    apply a threshold test to the element if the element passes the connectivity test and the distance test, wherein said threshold test determines if one or more graphic components of the element are within a specified range of one or more specified thresholds for the graphic components; and
    add the element to the extended region if the element passes the threshold test.

14. The system as recited in claim 11, wherein said image segmentation mechanism is a test area-based region growing mechanism, wherein a test area is defined by a specified radius, and wherein said test area-based region growing mechanism is configured to add elements to a region being grown using a threshold test that determines if one or more graphic components of an element under test and of all elements within a test area defined by the radius around the element under test are within a specified range of one or more specified thresholds for the graphic components.

15. The system as recited in claim 14, wherein the specified distance is the radius used by the test area-based region growing mechanism.

16. The system as recited in claim 11, wherein the image data set is a two-dimensional image, wherein the image elements are pixels, and wherein the region is a two-dimensional region within the two-dimensional image.

17. The system as recited in claim 16, wherein the two-dimensional image is a medical image.

18. The system as recited in claim 11, wherein the image data set is a three-dimensional image set comprising a plurality of slices, wherein each slice is represented by a two-dimensional image, wherein the image elements are voxels, and wherein the region and the extended region are three-dimensional volumes within the three-dimensional image set.

19. The system as recited in claim 18, wherein the three-dimensional image set is a medical image.

20. The system as recited in claim 18, wherein the three-dimensional image set is captured using one of Magnetic Resonance Imaging (MRI), computed tomography (CT), positron emission tomography (PET), ultrasound, and X-Ray.

21. A non-transitory computer-readable storage medium, comprising program instructions, wherein the program instructions are computer-executable to implement a dilation mechanism configured to:
   receive a region generated by an image segmentation mechanism configured to generate the region comprising a subset of image elements within an object of interest in an image data set, wherein the image segmentation mechanism leaves an edge inset between a boundary of the region and a true edge of the object of interest;
   extend the region generated by the image segmentation mechanism to generate an extended region including at least a portion of image elements in an area defined by the edge inset; and
   limit the extension of the region to a specified distance from the outer boundary of the original region generated by the image segmentation mechanism, wherein said limiting comprises iteratively testing individual image elements to determine if the individual image elements are within the specified distance from the outer boundary of the original region generated by the image segmentation mechanism.

22. The non-transitory computer-readable storage medium as recited in claim 21, wherein, to extend the region generated by the image segmentation mechanism, the dilation mechanism is further configured to:
   for each element in a set of image elements to be tested that includes at least the image elements in the area defined by the edge inset:
      get an element that is connected to at least one element currently in the extended region, wherein the extended region includes the elements in the original region generated by the image segmentation mechanism and all elements that have been added to the original region;
      add the element to the extended region if the element is within the specified distance from the boundary of the original region generated by the image segmentation mechanism and if one or more graphic components of the element are within a specified range of one or more specified thresholds for the graphic components.

23. The non-transitory computer-readable storage medium as recited in claim 21, wherein, to extend the region generated by the image segmentation mechanism, the dilation mechanism is further configured to:
   for each element in a set of image elements to be tested that includes at least the image elements in the area defined by the edge inset:
      apply a connectivity test to the element, wherein said connectivity test determines if the element is connected to at least one element currently in the extended region, wherein the extended region includes the original region generated by the image segmentation mechanism and all elements that have been added to the original region;
      apply a distance test to the element if the element passes the connectivity test, wherein said distance test determines if the element is within the specified distance from the boundary of the original region generated by the image segmentation mechanism;
      apply a threshold test to the element if the element passes the connectivity test and the distance test, wherein said threshold test determines if one or more graphic components of the element are within a specified range of one or more specified thresholds for the graphic components; and
      add the element to the extended region if the element passes the threshold test.

24. The non-transitory computer-readable storage medium as recited in claim 21, wherein said image segmentation mechanism is a test area-based region growing mechanism, wherein a test area is defined by a specified radius, and wherein said test area-based region growing mechanism is configured to add elements to a region being grown using a threshold test that determines if one or more graphic components of an element under test and of all elements within a test area defined by the radius around the element under test are within a specified range of one or more specified thresholds for the graphic components.

25. The non-transitory computer-readable storage medium as recited in claim 24, wherein the specified distance is the radius used by the test area-based region growing mechanism.

26. The non-transitory computer-readable storage medium as recited in claim 21, wherein the image data set is a two-dimensional image, wherein the image elements are pixels, and wherein the region is a two-dimensional region within the two-dimensional image.

27. The non-transitory computer-readable storage medium as recited in claim 26, wherein the two-dimensional image is a medical image.

28. The non-transitory computer-readable storage medium as recited in claim 21, wherein the image data set is a three-dimensional image set comprising a plurality of slices, wherein each slice is represented by a two-dimensional image, wherein the image elements are voxels, and wherein the region and the extended region are three-dimensional volumes within the three-dimensional image set.

29. The non-transitory computer-readable storage medium as recited in claim 28, wherein the three-dimensional image set is a medical image.

30. The non-transitory computer-readable storage medium as recited in claim 28, wherein the three-dimensional image set is captured using one of Magnetic Resonance Imaging (MRI), computed tomography (CT), positron emission tomography (PET), ultrasound, and X-Ray.

* * * * *